United States Patent [19]
Plesko

[11] Patent Number: 5,668,362
[45] Date of Patent: *Sep. 16, 1997

[54] LIGHT BEAM SCANNER WITH OSCILLATORY SCAN ELEMENT

[75] Inventor: George A. Plesko, Media, Pa.

[73] Assignee: GEO Labs, Inc., Media, Pa.

[ * ] Notice: The term of this patent shall not extend beyond the expiration date of Pat. No. 5,422,471.

[21] Appl. No.: 473,016

[22] Filed: Jun. 6, 1995

Related U.S. Application Data

[63] Continuation of Ser. No. 745,905, Aug. 16, 1991, Pat. No. 5,422,471.

[51] Int. Cl.$^6$ ........................................ G06K 7/10
[52] U.S. Cl. .................... 235/467; 235/462; 310/20; 310/36; 359/213
[58] Field of Search ........................ 235/467, 462; 359/213, 214, 215; 310/36, 37, 38, 39, 20, 23

[56] References Cited

U.S. PATENT DOCUMENTS

| | | | |
|---|---|---|---|
| 3,532,408 | 10/1970 | Dostal | 359/214 X |
| 3,644,763 | 2/1972 | Skrobisch | 310/36 |
| 5,059,779 | 10/1991 | Krichever et al. | 235/462 X |
| 5,280,377 | 1/1994 | Chandler et al. | 359/213 X |
| 5,281,801 | 1/1994 | Shepard et al. | 359/214 X |

*Primary Examiner*—Donald T. Hajec
*Assistant Examiner*—Jeffrey R. Filipek

[57] ABSTRACT

A scanning device for projecting a light beam against a target having information contained thereon which is to be scanned by the light beam; and in particular relates to a compact laser scanning device, such as a bar code projecting a laser beam, and which device incorporates a drive component such as a scanning motor for oscillating a scanning element or mirror at a high rate of speed within a specified angular range so as to cause the light or laser beam which impinges against the information on the target to be rapidly swept across the information in a scanning sequence. In particular, the structure is directed to improving the linearity of the oscillatory or "dithering" motion imparted by the scanning motor to the scanning element or mirror. Also contemplated is a novel method of utilizing the "dithering" or oscillating motion of the scanning motor for effectuating an improvement in the quality of the scan by the scanning device.

20 Claims, 9 Drawing Sheets

LIGHT BEAM SCANNER WITH OSCILLATORY SCAN ELEMENT

This is a continuation of application Ser. No. 07/745,905 filed on Aug. 16, 1991, U.S. Pat. No. 5,422,471.

BACKGROUND OF THE INVENTION

1. Field of the Invention

The present invention relates to a scanning device for projecting a light beam against a target having information contained thereon which is to be scanned by the light beam; and in particular relates to a compact laser scanning device, such as a bar code reader projecting a laser beam, and which device incorporates a drive component such as a scanning motor for oscillating a scanning element or mirror at a high rate of speed within a specified angular range so as to cause the light or laser beam which impinges against the information on the target to be rapidly swept across the information in a scanning sequence. In particular, the invention is directed to improving the linearity of the oscillatory or "dithering" motion imparted by the scanning motor to the scanning element or mirror. The invention also contemplates a novel method of utilizing the "dithering" or oscillating motion of the scanning motor for effectuating an improvement in the quality of the scan by the scanning device.

The utilization of laser scanning devices for the scanning or reading of information provided on a target; such as a package or sale item, is well known in this particular technology and has found wide acceptance in commerce. In this connection, various types of laser scanning devices incorporate scanning heads which house optical reading systems, such as bar code readers, for the reading of information or bar code symbols on targets which are scanned by a laser beam projected from the bar code reader. In general, such laser scanning devices; especially those in the type of bar code readers, are widely employed in industry, such as manufacturing, shipping, and in retail commerce and; for example, may be permanently incorporated in the structures of check-out counters of supermarkets, whereby the items of merchandise having the bar code symbols imprinted thereon or applied thereto are passed over a fixed bar code reader located beneath the counter surface so as to provide a record for the merchant of the merchandise being purchased by a consumer, and concurrently a readout (and possibly a printed record) for the consumer.

Alternatively, the bar code reader or laser scanning device may also be constituted of an optical scanner unit which is fixedly mounted on a stand extending above a support platform or countertop on which the merchandise may be arranged; or in many instances of utilization, pursuant to a preferred embodiment of the invention, may be in the form of a miniature, lightweight and gun-shaped device having a pistol grip, and which the activated device is normally passed over the bar code symbol which is imprinted on a sale item or target at some short distance therefrom so as to enable scanning of the information provided by the bar code symbols.

2. Discussion of the Prior Art

Various optical readers and optical scanning systems have been developed heretofore for reading bar code symbols appearing on a label or on the surface of an article. The bar code symbol itself is a coded pattern of indicia comprises of a series of bars of various widths spaced apart from one another to bound spaces of various widths, the bars and spaces having different light-reflecting characteristics. The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications, in point-of-sale processing, inventory control, and the like. Scanning systems of this general type have been disclosed, for example, in U.S. Pat. Nos. 4,251,798; 4,369,361; 4,387,297; 4,409,470; 4,760,248; and 4,896,026, all of which have been assigned to the same assignee.

As disclosed in some of the above patents, one embodiment of such a scanning system resides, inter alia, in a hand-held, portable laser scanning head supported by a user, which is configured to allow the user to aim the head, and more particularly, the light beam or laser beam projected therefrom, at a target and a symbol which is to be read.

The light source in a laser scanner is typically a gas laser or semiconductor laser. The use of semiconductor devices, such as a laser diode, as the light source in scanning systems is especially desirable because of their small size, low cost and low power requirements. The laser beam is optically modified, typically by a lens, to form a beam spot of a certain size at the target distance. It is preferred that the beam spot size at the target distance be approximately the same as the minimum width between regions of different light reflectivity, i.e., the bars and spaces of the symbol.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

For purpose of discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In the scanning systems known in the art, the light beam is directed by a lens or similar optical components along a light path toward a target that includes a bar code symbol on the surface. The scanning functions by repetitively scanning the light beam in a line or series of lines across the symbol. The scanning component may incorporate a drive or scanning motor adopted to either sweep the beam spot across the symbol and trace a scan line across and past the symbol in a high-speed repetitive mode, or scan the field of view of the scanner, or do both.

Scanning systems also normally include a sensor or photodetector which functions to detect light reflected from the symbol.

The photodetector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric characters so represented.

The decoding process in known scanning systems usually work in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Laser scanners are not the only type of optical instrument capable of reading bar code symbols. Another type of bar code reader is one which incorporates detectors based upon charge coupled device (CCD) technology. In such readers, the size of the detector is larger than or substantially the same as the symbol which is to be read. The entire symbol is flooded with light from the reader, and each CCD cell is sequentially read out to determine the presence of a bar or a space. Such readers are lightweight and easy to use, but require substantially direct contact or placement of the reader on the symbol to enable the symbol to properly read. Such physical contact of the reader with the symbol is a preferred mode of operation for some applications, or as a matter of personal preference by the user.

Among problems which are frequently encountered in the use of such laser beam devices which incorporate driving means, such as stepper motors, for "dithering" or essentially oscillating a scanning element or mirror in a reciprocatory or angular back and forth motion at high speeds, is the aspect that the scanning of the symbol is frequently distorted through vibratory effects or "jerky" motions which are superimposed on the scanning movement, and which are caused by the poles in the stepper motor, thus the movement of the scanning element or mirror, thereby tending to adversely influence the quality of the scanning process. Under ideal conditions, this angular reciprocatory or oscillating movement or "dithering" of the scanning element or mirror should be carried out to be as linear as possible during the operation of the scanning element. In essence, the speed of movement during the angular displacement should be as constant as possible over a reasonable scanning angle of less than 360°, preferably within the range of about ±5° to ±7° from a central or neutral position during the oscillation of the scanning element by the scanning motor.

Heretofore, attempts have been undertaken in the technology to overcome problems of this kind to some extent through the imposition of a D.C. current component on an alternating current which is applied to the coils of an electromagnetic stepper motor interacting with the permanent magnet thereof so as to cause the rotor of the stepper motor mounting the scanning element to "dither" or essentially oscillate in a somewhat more linearly oriented manner. In this connection, suitable types of wave forms for alternating currents may also be applied to the coils of the scanning motor in order to linearize the reciprocatory movement to the greatest possible extent; for instance, such as by utilizing a triangular A.C. wave form, amongst others.

However, although some degree of success has been achieved in linearizing the oscillating movement of such high speed scanning motors in order to reduce potential vibrations and adverse effects over scanning quality, the sudden reversal in direction at each end of the sweeping motion of the rotor shaft of the scanning motor mounting the scanning element or mirror, will prevent attaining any reasonable or satisfactory degree of linearity for such reversing oscillatory movement, and result in the generating of undesirable vibrations or jerky motions in the scanning element or mirror during operation of the scanning device.

SUMMARY OF THE INVENTION

In order to overcome or ameliorate problems of this kind which may be encountered in such scanning devices or bar code readers incorporating scanning motors mounting scanning elements or mirrors for high-speed oscillation of the latter, and to improve upon the degree of linearity attained during such oscillating movement of the scanning element or mirror to thereby reduce by a significant extent any potential vibrations tending to degrade the quality of scanning by the devices, the invention contemplates the provision of an electromagnetic scanning motor in which a permanent magnet is connected to or mounted on the free end of an arm member which is fixed secured to the rotor shaft of the motor mounting the scanning element or mirror so as to be rotatable or oscillatable in conjunction therewith through limited angular displacement. The oscillatory movement to the rotor shaft and the scanning element fixedly mounted thereon is effectuated through the application of an alternating current to the fixed coils of the scanning motor which are wound on a hollow core providing for an opening or passage therein into which there is resultingly cyclically drawn during each halfwave of the current the permanent magnet mounted at the free end of the arm which is fastened to the rotor shaft, so as to cause the rotational oscillatory movement of the rotor shaft. In accordance with the inventive structure of the scanning motor, the motor has a housing containing the coils in a fixed position therein and with the rotor shaft being rotatable about its longitudinal axis while journaled in suitable bearing structure of the housing with the end of the rotor shaft mounting the scanning element protruding from the housing. Hereby, the housing containing the scanning motor components is fixedly secured in the scanning device, as is known in the art. Interposed within the housing is a resilient biasing element; such as in the shape of a flat or platelike helical spring having one end thereof; i.e. the inner end, fastened to the rotor shaft and the other end; i.e. the outer end, fastened secured against rotation to the structure of the scanning motor housing. The spring is calibrated to provide a spring force acting on the rotor shaft opposite the force exerted thereon by the electromagnetic force between the coils and magnet causing the rotor shaft to be oscillated at high rates of speed between two angular end positions in a "dithering" movement from a neutral position intermediate the two opposite end positions thereof. Thus, when the rotor shaft is oscillated about its axis through an angle of less than 360°, preferably ±5° to 7° from such neutral position, the spiral spring imparts a restoring spring force or counterforce or counteracting torque of variable spring rate to the rotor shaft tending to impart a greater degree of linearity to the oscillatory or "dithering" rotational movement caused by the electromagnetic motor. This particular functional aspect, in essence, reduces any vibrations which may be potentially generated in the rotor shaft and, resultingly, in the scanning element or mirror mounted thereon, and provide for an improved and uniform quality in the repetitive high-speed scanning by the device of a target containing the information to be scanned thereon.

Accordingly, it is a general object of the present invention to provide novel drive component or scanning motor for a laser scanning device which is employed in the high-speed repetitive scanning of information contained on a target object.

Another object of the present invention resides in the provision of a laser scanning device of the type described herein in which a scanning motor of the electromagnetic type incorporates a spring element imparting a resilient biasing force to an output shaft of the scanning motor mounting a scanning element or mirror opposite the rotational force imparted thereto by the electromagnetic action of the motor to provide an enhanced degree of linearity to the oscillatory movement of the rotor shaft.

Yet another object of the present invention resides in the provision of a laser scanning device of the type described herein, in which a helical spring is operatively interposed between a stationary housing for a scanning motor and a rotor shaft of the motor mounting a scanning element or mirror for repeatedly at high speeds of oscillatory movement symbol on a target object, and wherein the helical spring imparts a biasing force opposite the rotational force imparted to the rotor shaft of the scanning motor so as to produce an enhanced degree of linearity to the oscillating speed of the shaft tending to inhibit the generating of "jerky" motions in the output shaft of the scanning motor which could conceivably adversely affect the scanning efficacy of the device

BRIEF DESCRIPTION OF THE DRAWINGS

Reference may now be had to the following detailed description of exemplary embodiments of the invention as represented by a laser scanning device incorporating an inventive scanning motor for imparting oscillatory movement to a scanning element or mirror mounted on an output shaft of the motor, taken in conjunction with the accompanying drawings; in which.

DETAILED DESCRIPTION

Figure 1:
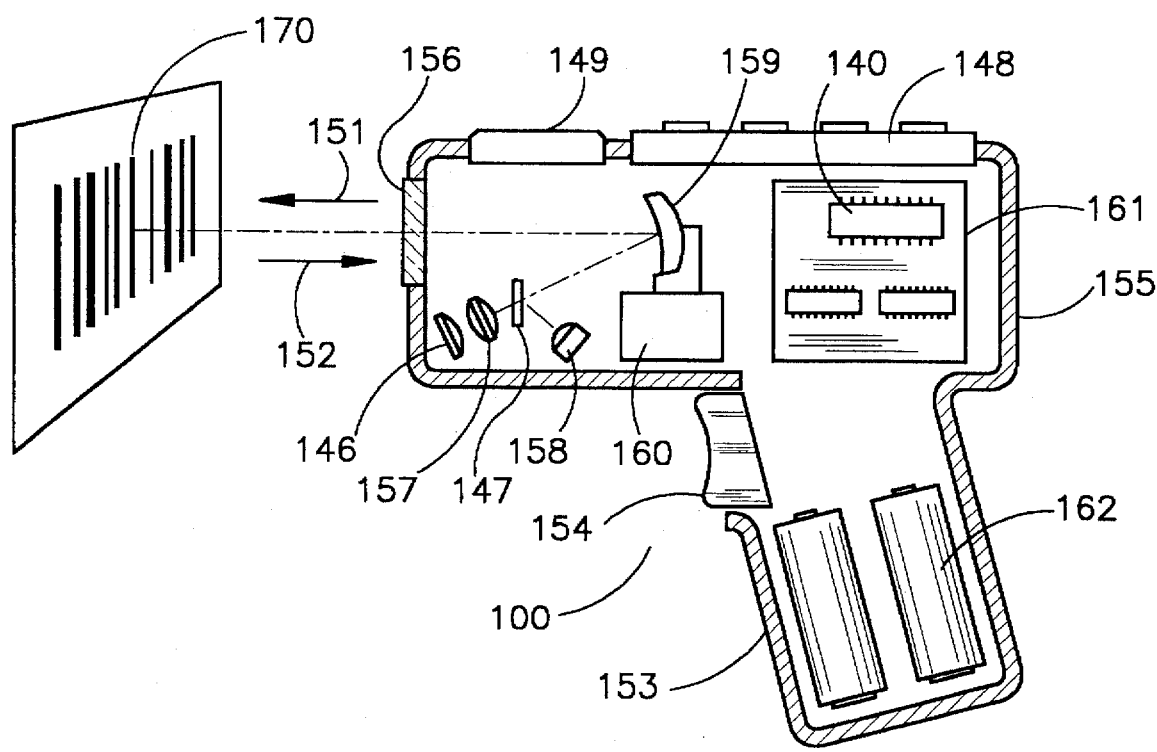
FIG. 1 illustrates a longitudinal sectional view through an exemplary embodiment of a laser scanning device incorporating the inventive scanning motor, wherein the scanning device is in the shape of a hand-held gun-shaped component.

Referring in more specific detail to the drawings, as diagrammatically illustrated in FIG. 1, pursuant to a typical exemplary embodiment, a laser scanning device may be a bar code reader unit 100 in a hand-held gun-shaped configuration, although obviously other kinds of configurations of scanners readily lend themselves to the invention, having a pistol-grip type of handle 153 and in which a movable trigger 154 is employed to allow the user to activate the light beam 151 and detector circuitry when pointed at the symbol to be read, thereby saving battery life if the unit is self-powered. A lightweight plastic housing 155 contains the laser light source, the detector 158, the optics and signal processing circuitry, and the CPU 140 as well as power source or battery 162. A light-transmissive window 156 in the front end of the housing 155 allows the outgoing light beam 151 to exit and the incoming reflected light 152 to enter. The reader 100 is designed to be aimed at a bar code symbol by the user from a position in which the reader 100 is spaced from the symbol, i.e., not touching the symbol or moving across the symbol. Typically, this type of hand-held bar code reader is specified to operate in the range of from contact with the symbol to distances of perhaps several inches or even further therefrom.

As further depicted in FIG. 1, a suitable lens 157 (or multiple lens system) may be used to focus the scanned beam into the bar code symbol at an appropriate reference plane. A light source 146, such as a semiconductor laser diode, is positioned to introduce a light beam into the axis of the lens 157, and the beam passes through a partially-silvered mirror 147 and other lenses or beam-shaping structure as needed, along with an oscillating mirror or scanning element 159 which is attached to a scanning motor 160 activated when the trigger 154 is pulled. If the light produced by the source 146 is not visible, an aiming light, if needed, produces a visible-light spot which may be fixed, or scanned just like the laser beam; the user employs this visible light to aim the reader unit at the symbol before pulling the trigger 154.

Figure 2:
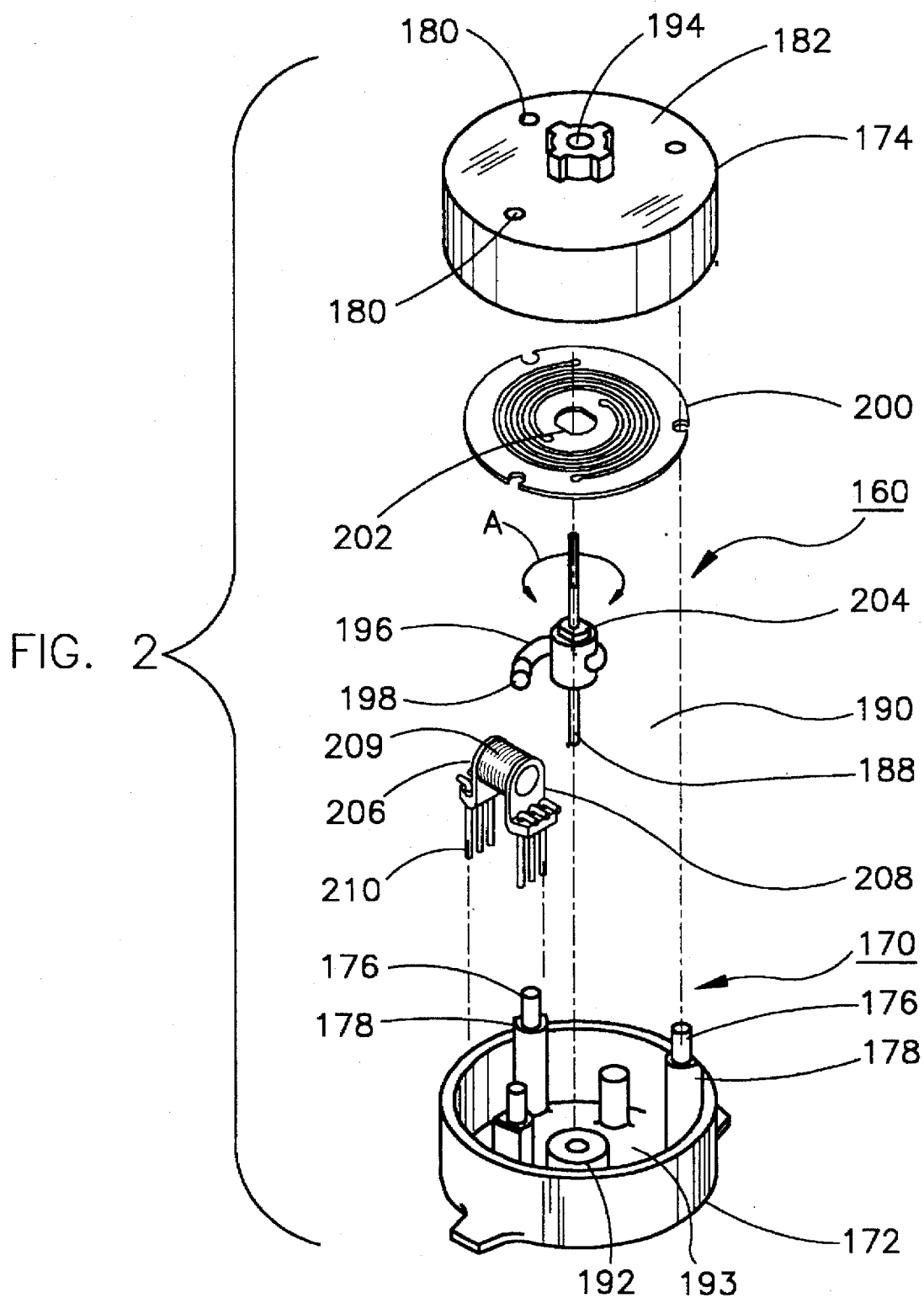
FIG. 2 illustrates an exploded perspective view of the scanning motor pursuant to the present invention.

Turning now to the constructional details of the inventive scanning motor or drive arrangement 160, having specific reference to the generally diagrammatic exploded perspective view in FIG. 2 of the drawings, the scanning motor 160 includes a shell 170 consisting of the first cup-shaped portion 172 and a complementary cup-shaped portion 174 adapted to be matingly assembled therewith and locked together through the intermediary of clamping projections or pins 176 spaced about the periphery of the inner wall of shell portion 172, formed on posts or lugs 178 molded therein, with the pins 176 lockingly engaging in holes 180, the end wall 182 of the shell portion 174. The shell portions 172, 174 of the scanning motor housing 170, when in the assembled position thereof in the laser scanning device 100, are adapted to be fixedly mounted therein through the intermediary of suitable fasteners (not shown) as is well known in the art. A rotor assembly 190 of the scanning motor 160 incorporates a rotor shaft 188 rotatable about its longitudinal axis as shown by double-headed arrow A, and has one end (the lower one) rotatably journaled in a bearing 192 located centrally in the lower end wall of the shell portion 172, which bearing may be a boss integrally formed with wall 193 as can be more clearly ascertained by reference to FIGS. 3 through 5 of the drawings.

In this construction, the upper end portion of the rotor shaft 188 extends through a central opening 194 formed in a boss on the end wall 182 of the upper shell portion 174 of the housing 170, and is adapted to have the scanning element or mirror 159 fastened thereto so as to be oscillatable through a predetermined angular displacement about the central longitudinal axis of the rotor shaft 188 in conjunction with the oscillation of the latter along arrow A.

Fastened to the rotor shaft 188 intermediate the ends thereof and within the confines of the motor housing 170 is a curvilinear arm 196 having a permanent magnet in the form of a cylindrical member 198 mounted on the free end thereof.

A spiral or helical spring 200 in the shape of a flat plate, which may be of a beryllium-copper alloy, is mounted on the rotor shaft 188 closely above or adjacent the arm 196, and with the spring having an elongate central aperture 202 mountable on a correspondingly shaped shoulder portion 204 on the rotor shaft 188 so as to be secured for rotation with the latter. The outer perimetral edge of the spring 200 includes cutouts engageable with the pins 176 so as to be fastened to the housing 170 and securing the outer perimeter of the spring 200 against relative rotation thereto, whereas the inner or central part of the spiral spring 200 is rotatable with the rotor shaft 188.

Within the shell portion 172 of the motor housing 170 there is secured a stationary coil assembly 206, having a coil drum element 208 with a central passage in the shape of a cylindrical through-bore into which the magnet 198 is adapted to be drawn during oscillation of the rotor shaft 188 responsive to the application of an alternating current to the coils 209. The electrical lines 210 leading to the magnetic coil assembly 206 are connectable to a suitable alternating-current supply source externally of the scanning motor 160.

Figure 3:
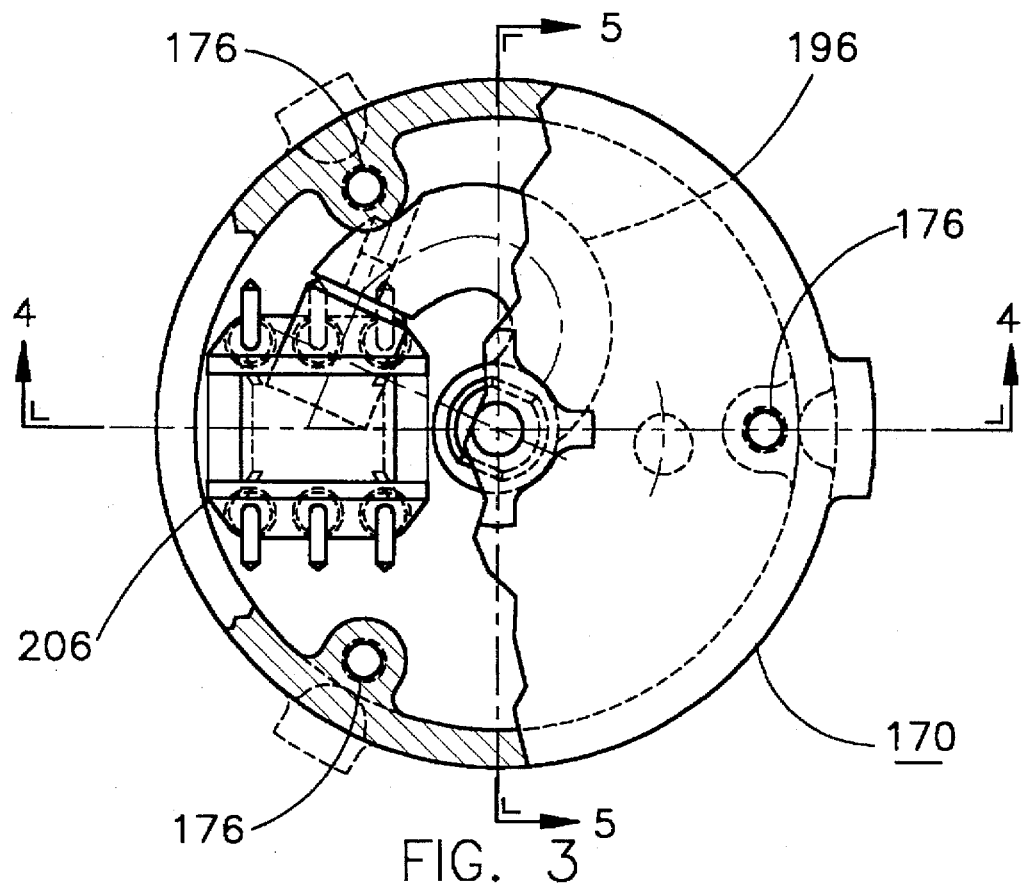
FIG. 3 illustrates a top plan view, shown partly in section, of the scanning motor of FIG. 2.
Figure 4:
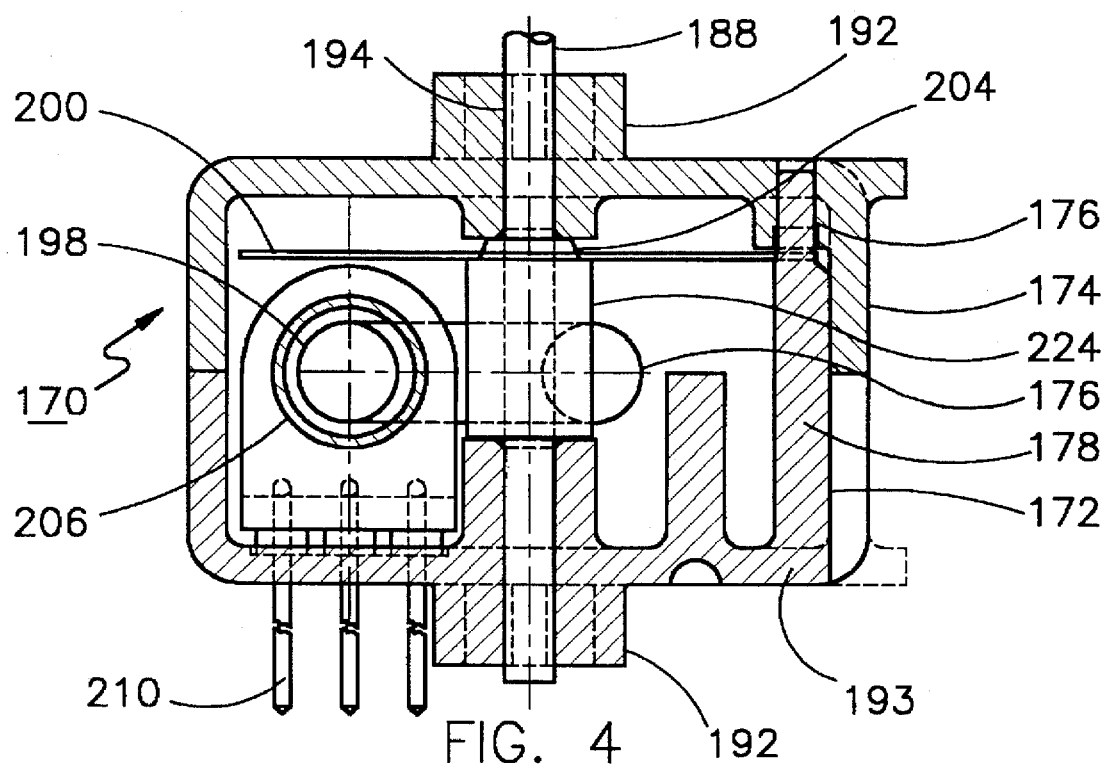
FIG. 4 illustrates a cross-sectional view of the scanning motor taken along line 4—4 in FIG. 3.
Figure 5:
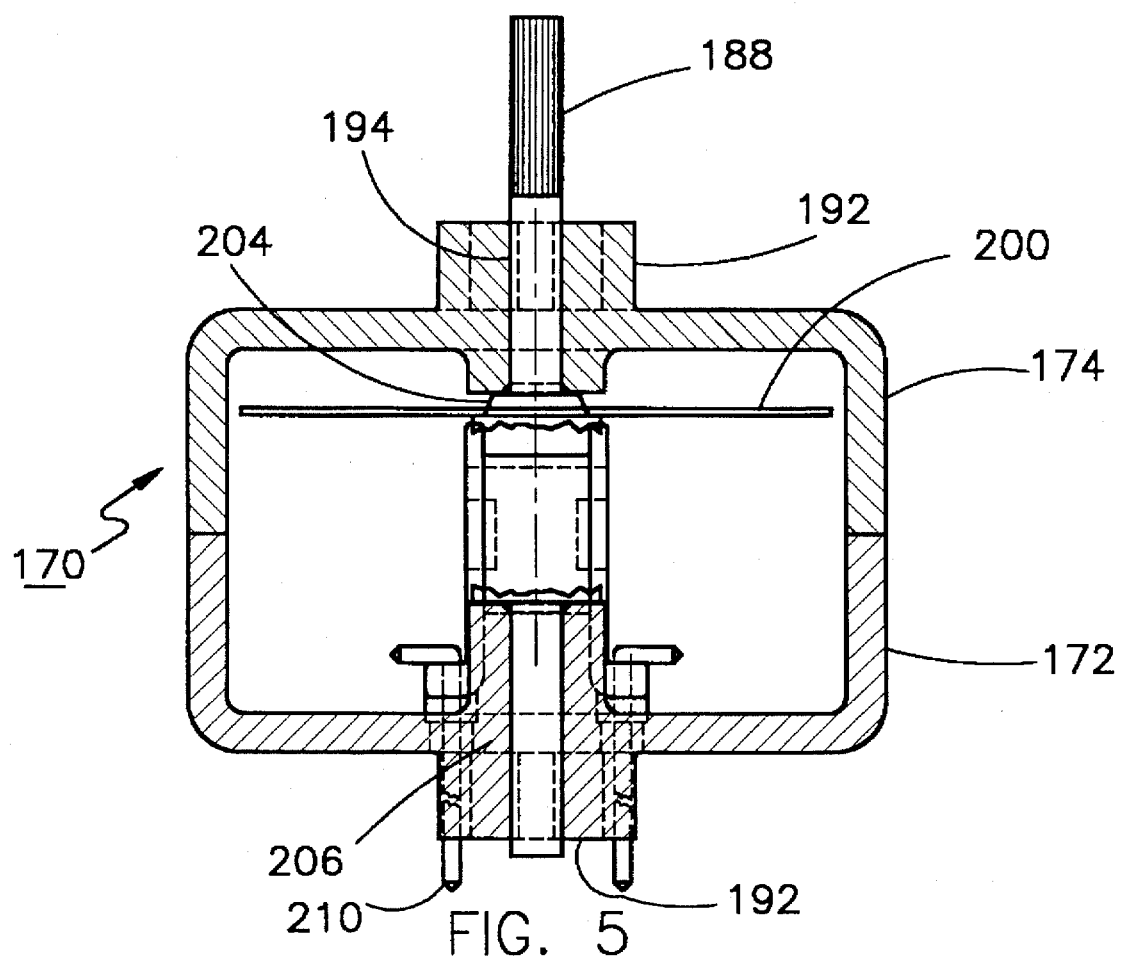
FIG. 5 illustrates a cross-sectional view of the scanning motor taken along 5—5 in FIG. 5.

Reverting in further detail to the construction of the essential components of the scanning motor 170, as shown in FIGS. 3 through 5 of the drawings, the lower and upper shell portions 172 and 174 of the housing are adapted to be superimposed in the form of two inverted cups and brought into mating alignment by means of the upstanding posts 178, whose upper ends in the form of the 176 engage with a close fit into the holes 180 formed in the end wall 182 of the upper shell portion 174. The end wall 182 of the upper shell portion 174 and the end wall 193 of the lower shell portion 172 of the housing 170 of the scanning motor each have bosses 192 integrally molded therewith, with each of the bosses having central apertures 194 providing bearing surfaces for rotatably supporting the rotor shaft 188.

A shoulder or cylindrical bushing 224 which fixedly secured to the rotor shaft 188 has the arm 196 fastened thereto, as is clearly shown in FIG. 2 of the drawings, and the free end of the arm has the permanent magnet 198 mounted thereon so as to be on an arc of movement in alignment with the bore of coil drum element 208. The arm 196 is essentially curvilinear in shape, as can be more clearly ascertained from FIG. 3 of the drawings.

Figure 6:
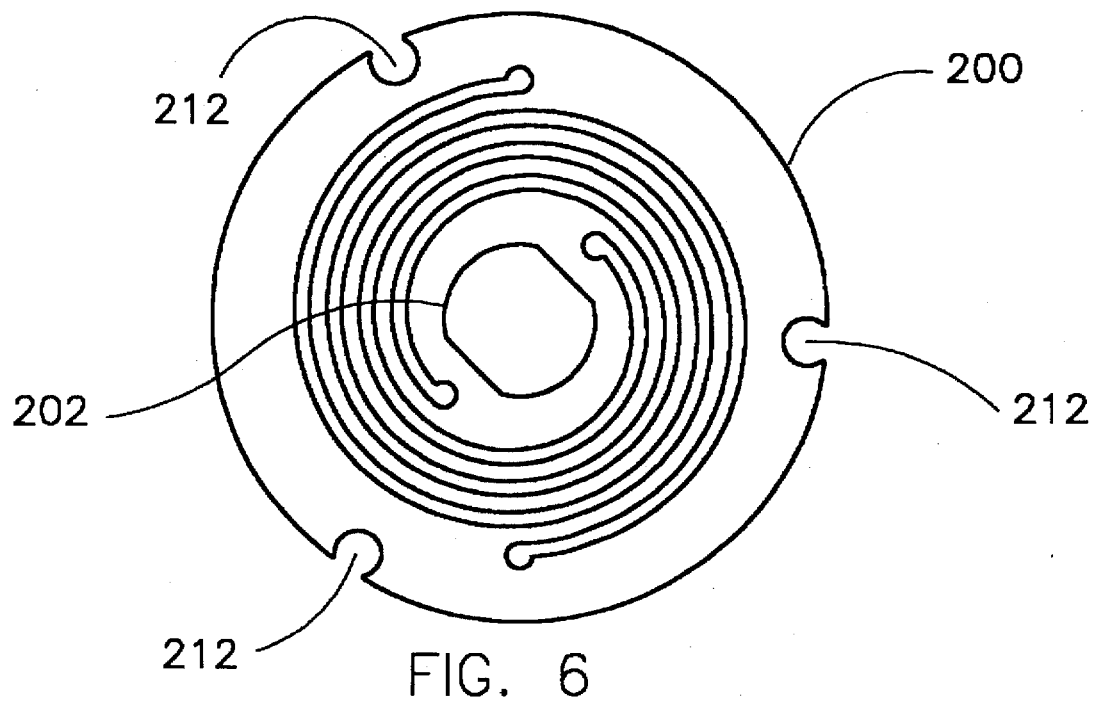
FIG. 6 illustrates a plan view of the spring element employed in the scanning motor pursuant to the invention.

Mounted on the rotor shaft 188, above the bushing 124, positioned in engagement on shoulder 204 is the helical or spiral plate-shaped spring 200 as described and shown in FIG. 6, in which a central aperture 202 of the spring has a non-circular configuration in conformance with the shoulder 204 so as to be fastened to the rotor shaft 188 secured for rotation therewith at the center thereof. The outer perimeter of the spring 200 is secured to the housing 170 in that cutouts 212 which are formed in and spaced about the outer circumference of the spring 200 have the respectively therewith aligned upstanding pins 76 engagingly extend therethrough upon assembly of the housing shell portions 172 and 174, as shown in FIG. 4 of the drawings, thereby causing the outer rim or perimetral portion of the spring 200 to be secured against relative rotation with respect to the scanning motor housing 170. Concurrently, the locking engagement between the central portion of the spring 200 and the rotor shaft 188 due to the interengagement of the spring aperture 202 and the shoulder 204 ensures that the center portion of the spring is moved in conjunction with the oscillatory movement of the rotor shaft 188.

Figure 9:
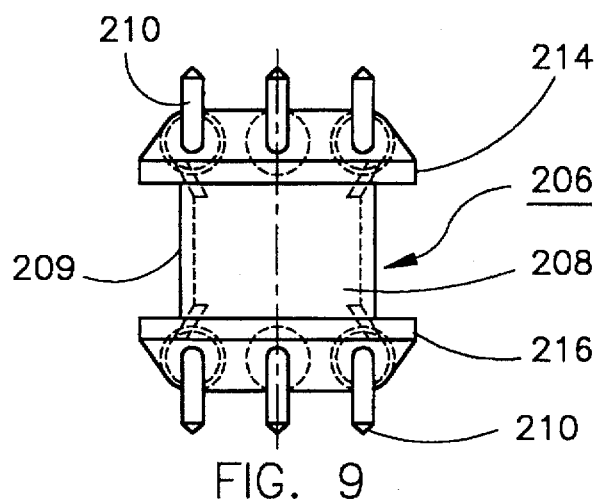
FIG. 9 illustrates a top plan view of the coil arrangement.
Figure 7:
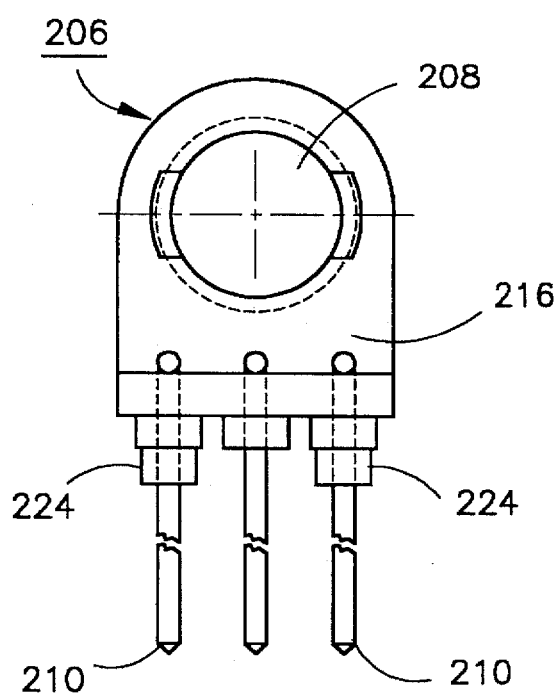
FIG. 7 illustrates an end view of the electrical coil arrangement for the scanning motor.
Figure 8:
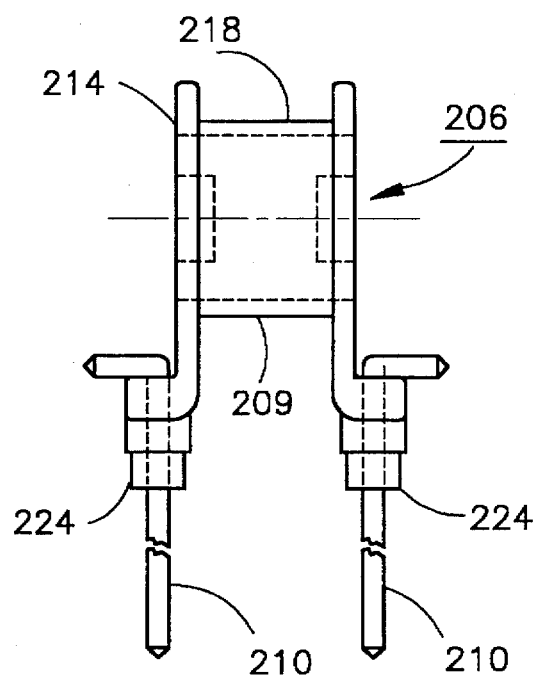
FIG. 8 illustrates a side view of the coil arrangement.

As shown in detail in FIGS. 7 through 9, the magnetic coil assembly 206 includes parallel spaced end plates 214 and 216 which are secured to the opposite ends of a cylindrical core 218 about which the coils 209 are adapted to be wound. The coils 209 are connected to electrical leads 220 extending outwardly of the housing 170 through apertures 222 formed in the end wall 193 of the shell portion 172, so as to connect to a source of electrical power; for instance, the battery 162, or any other source of power. Protuberances 224 formed on flange portions of the end plates 214, 216 engage into the conformingly shaped apertures 222 so as to securely anchor the entire magnetic coil assembly 206 in position within the housing 170.

Figure 10:
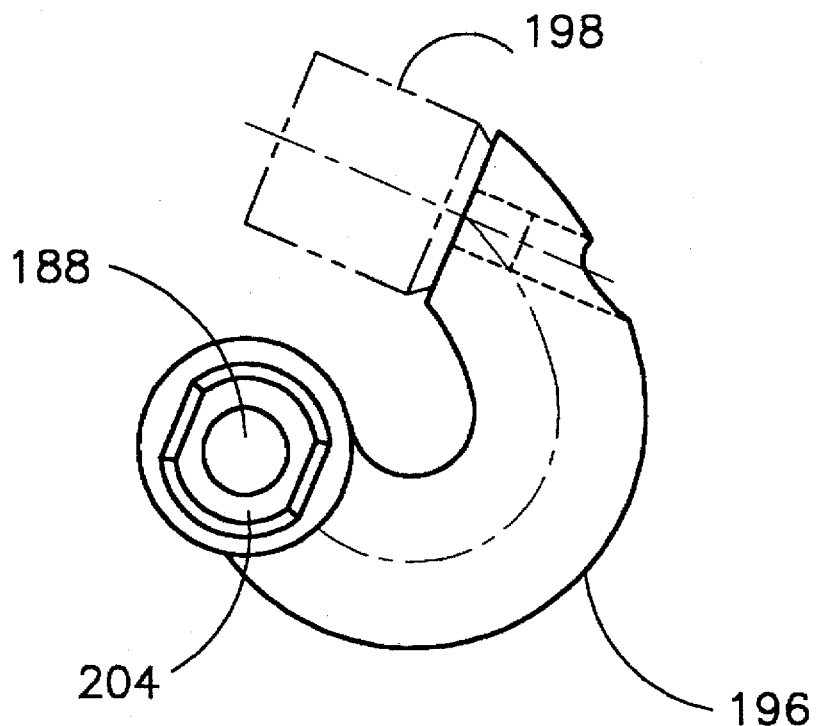
FIG. 10 illustrates a top plan view of a rotor shaft portion of the scanning motor having an arm thereon with a permanent magnet mounted on the free end of the arm.
Figure 11:
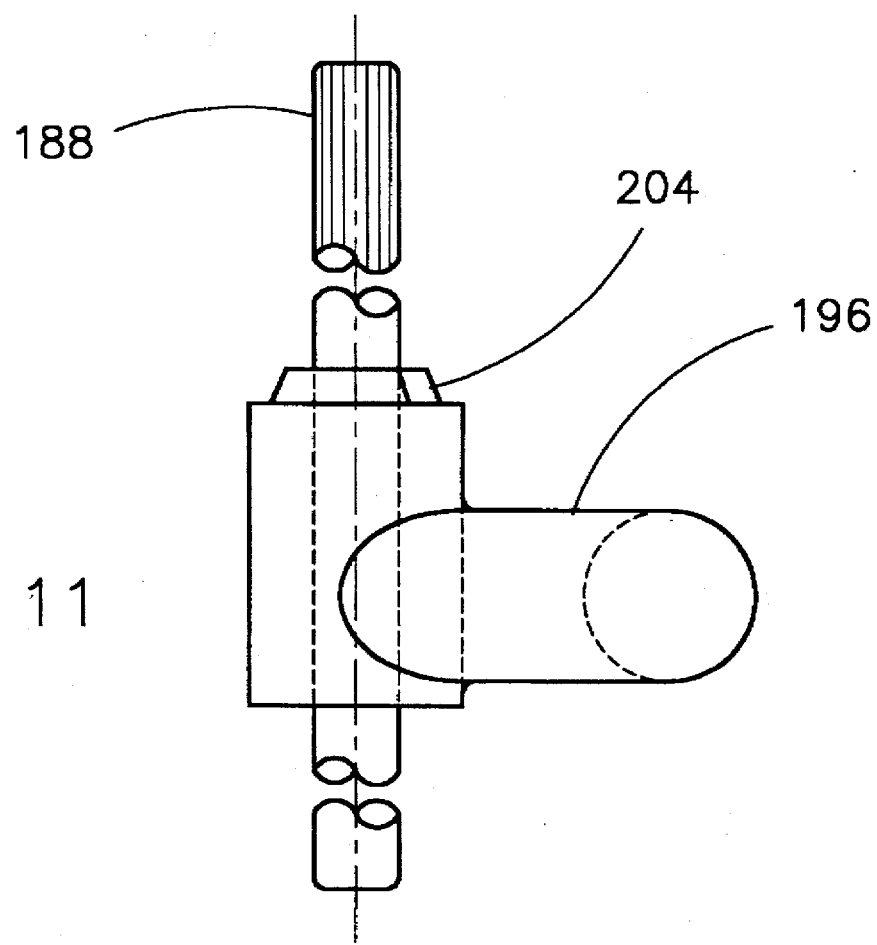
FIG. 11 illustrates a side view of the rotor shaft portion having the arm thereon.

The arm 196 which is secured to the rotor shaft 188, and which has the permanent magnet 198 mounted on the free end thereof as shown in FIGS. 10 and 11 of the drawings, has a curvilinear configuration such that, during rotation or oscillation of the rotor shaft 188 about its axis, the curvature of the arm 196 the free end thereof having the magnet 198 thereon to carry out an arcuate sweeping path of movement causing the magnet to travel into and exit from the opening 200 extending through the core 218 of the magnetic coil assembly.

At the imparting of an electrical current to the magnetic coils 209, essentially an alternating current, during each successive half-cycle of the current, the magnet 198 is alternatingly drawn into or repulsed from the magnetic core assembly in response to the reversing polarity of the current, so as to, through the pivoting movement imparted to the arm 196, cause the rotor shaft 188 to oscillate about it longitudinal axis as shown by the double-headed arrow A, to define a predetermined angular displacement from a neutral position of less than 360°; preferably ±5° to 7° in opposite directions from the neutral position thereof. The helical spring 200 causes a biasing force or torque to be exerted opposite the direction of angular displacement of the rotor shaft 188 from its neutral position, and with the spring force gradually increasing as the rotor shaft 188 reaches its respective extreme end positions of movement. Consequently, the imposition of the opposing torsional spring force to the rotor shaft 188 by the spring 200; in essence, will increase the linearity in the rotational speed of movement, so as to reduce any vibrations or jerky motions potentially imparted to the rotor shaft 188 by the sudden reversal in its directions of travel at its end positions, which conceivably could cause such vibratory or jerky actions to be imparted to the scanning element or mirror 159 mounted at the end of the rotor shaft 188, and which would tend to adversely influence the quality in the scanning functioning of the laser beam being projected against the information on a target within a critical scanning range.

Obviously, the housing 170, the rotor shaft 188, the arm 193 and the various structural components thereof may be molded from a suitable plastic material, as is known in this technology pertaining to the constructions of electromagnetic scanning motors.

Further embodiments of an electromagnetic scanning motor pursuant to the inventive concept are shown in the schematic representations of FIGS. 12 through 17.

Figure 12:
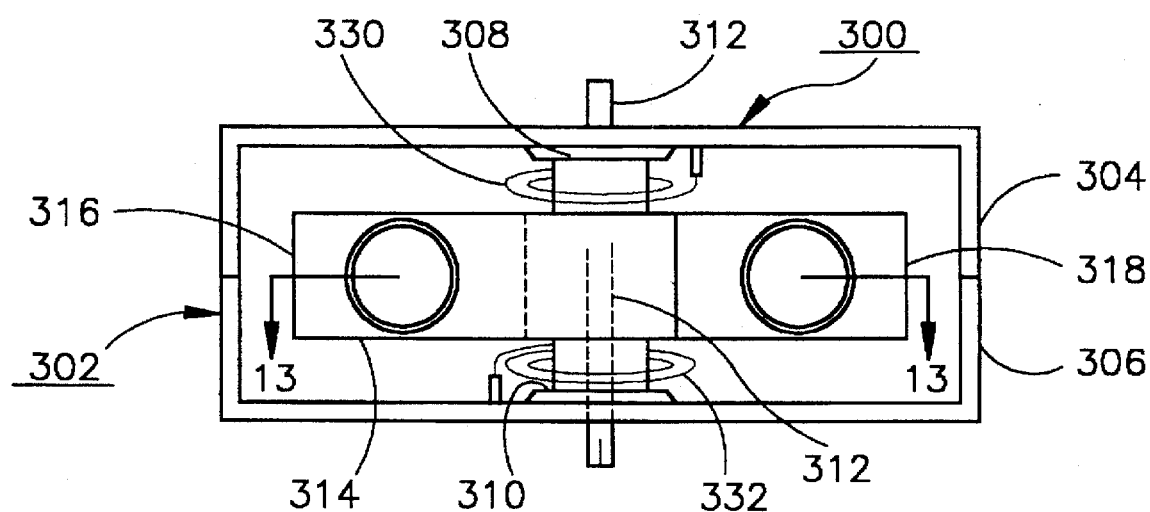
FIG. 12 illustrates, in a generally schematic representation, a cross-sectional view through a second embodiment of a scanning motor pursuant to the invention.
Figure 13:
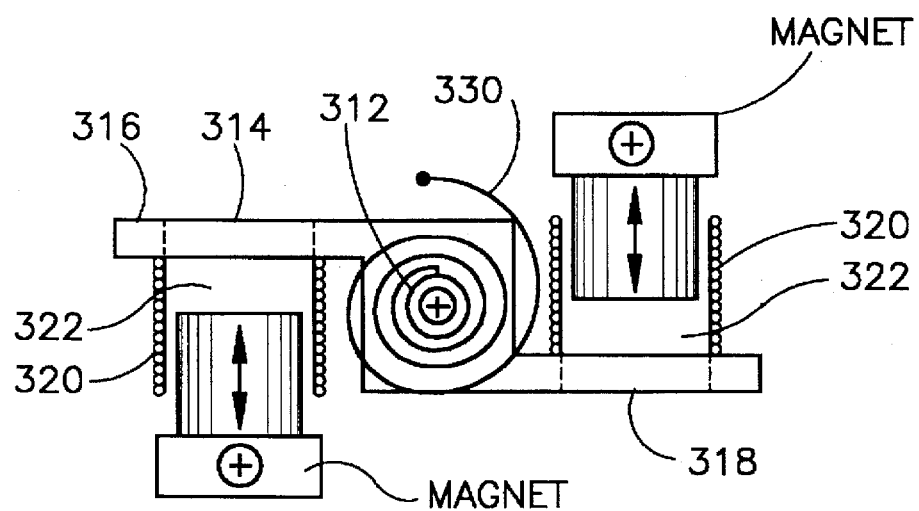
FIG. 13 illustrates a sectional view taken along line 13—13 in FIG. 12.

The embodiment of FIGS. 12 and 13 discloses a scanning motor 300 having a housing 302 which may consists of an upper and lower mating shell member 304 and 306, each of which respectively includes a bearing structure 308 and 310 for rotatably journaling a rotor shaft 312, the upper end of which may have a suitable scanning element or mirror (not shown) fastened thereto for oscillatory movement in conjunction with the rotor shaft.

Arranged within the housing 302 and rotatable together with the rotor shaft 312 is a plate member 314 which has arm portions 316 and 318 extending in generally radially opposite directions from the shaft 312.

Each arm portion 316, 318 has mounted thereon an air coil 320 on a suitable bobbin support 322; whereas permanent magnets 324 are adapted to be axially received within the coils, with the faces of the magnets being located in the center of each of the air coils 320 when the coils are not electrically energized. The magnets are fastened to the housing structure 302 so as to be secured against movement; whereas the arm portions 316 and 318 supporting the air coils form a rotor arm structure oscillatable in conjunction with the reciprocal or oscillatory movement of the rotor shaft 312 supporting a scanning element (not shown).

The counteracting spring biasing force or torque tending to linearize the speed in the rotational movement of the rotor shaft is provided for by two spiral springs 330 and 332 which are located within the confines of the housing 302 so as to extend about the rotor shaft above and below the plate member 314; whereby the peripherally outer end of each of the springs is fastened to, respectively, one of the shell members 304 and 306, such as being attached to an upstanding post or connector 336, whereas the inner or central end of each spring is fastened to the rotor shaft 312 so as to be movable in conjunction with the rotation thereof. Consequently, this will impart a variable counteracting force or torque to the rotor shaft opposite the rotation of the latter, which increases as the rotor shaft reaches an extreme end position in its angular displacement from a neutral position, in a manner as described in connection with the preceding embodiment of FIG. 2 of the drawings.

Figure 14:
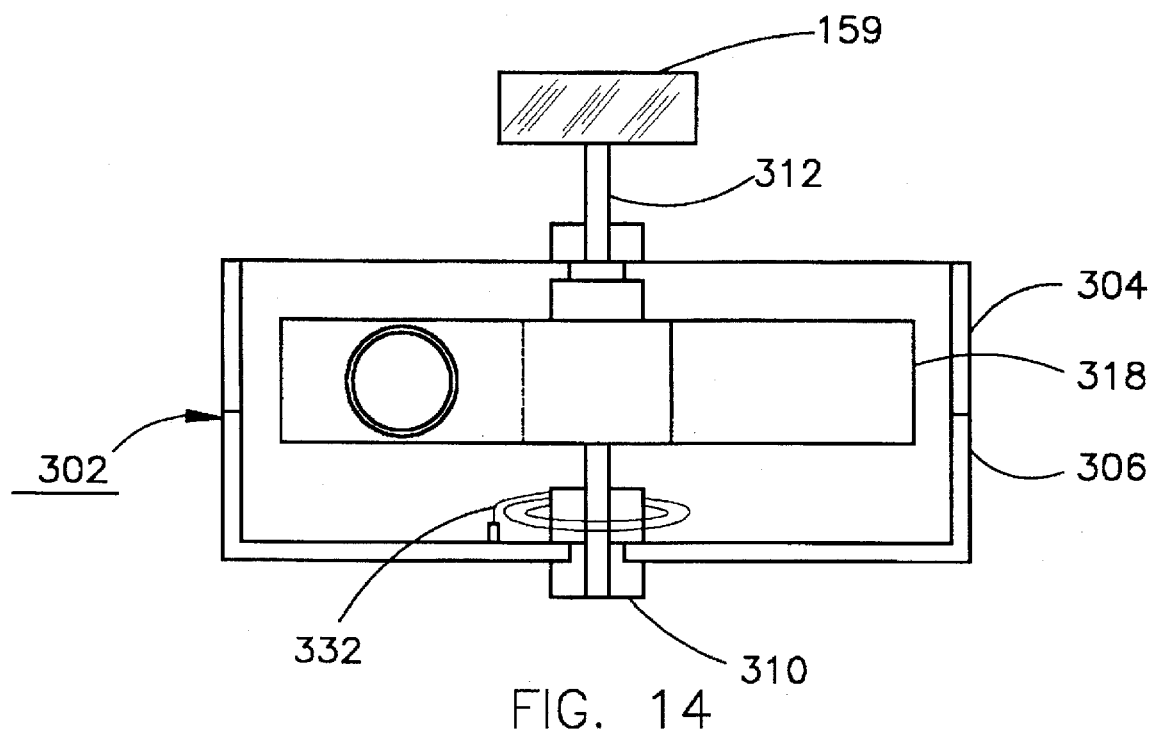
FIG. 14 illustrates a schematic cross-sectional representation, similar to FIG. 12, third embodiment of the scanning motor pursuant to the invention.
Figure 15:
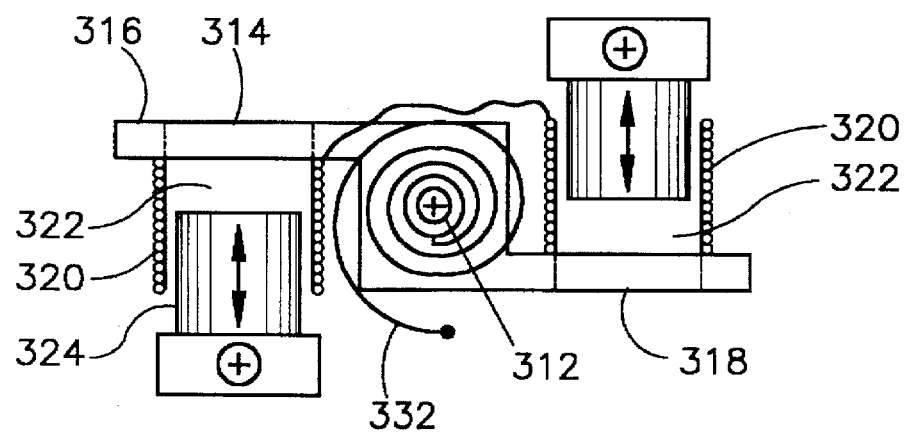
FIG. 15 illustrates a sectional view taken along line 15—15 in FIG. 14.

In the embodiment of the FIGS. 14 and 15, components similar to or identical with those in FIGS. 12 and 13 are identified with the same reference numerals. Herein, the scanning motor merely differs in that only a single spiral spring 332 is utilized instead of the two springs in the preceding embodiment.

Figure 16:
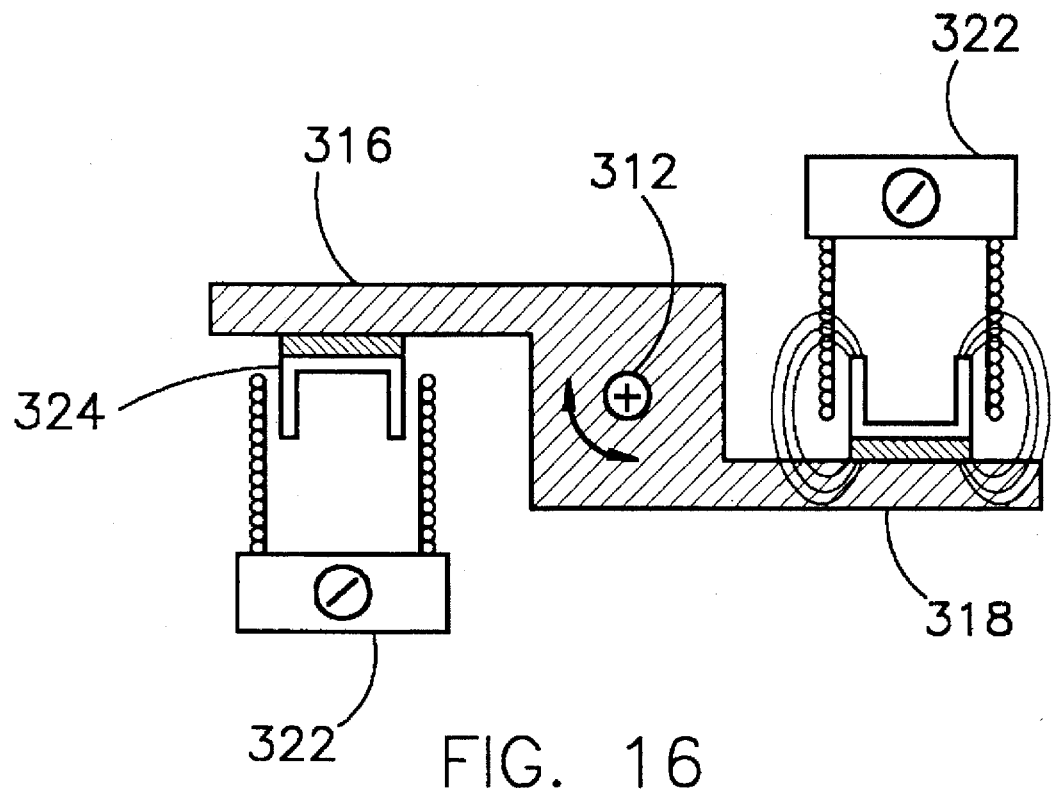
FIG. 16 illustrates a fourth embodiment of a scanning motor similar to that of FIG. 15.

The embodiment of the scanning motor in FIG. 16 of the drawings is similar to that of FIGS. 14 and 15, in which identical or similar components are identified by the same reference numeral. However, in this instance, the permanent magnets 324 are mounted on the respective arms 316 and 318 of the rotor plate 314, which are rotatable in conjunction with the rotor shaft 312, whereas the coils 320 are fixed onto a coil mount or bobbin support 322 which is attached to the respective shell portions 304, 306 of the motor housing 302. For the remainder, the operation is identical with that of the embodiment of FIGS. 14 and 15.

Figure 17:
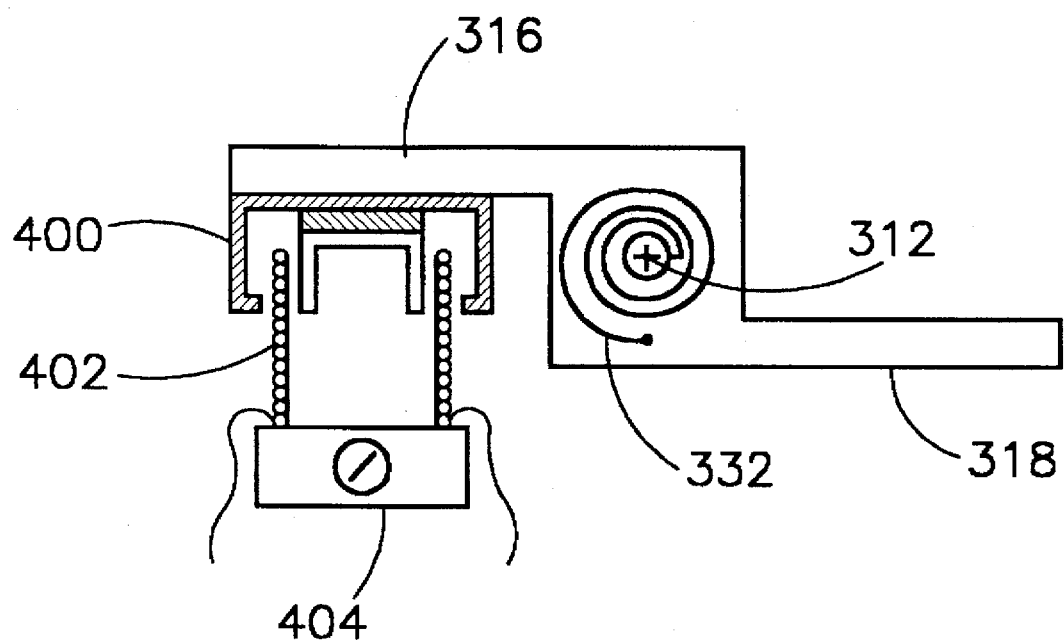
FIG. 17 illustrates a fifth embodiment of a scanning motor similar to that of FIG. 15.

Finally, in the embodiment of FIG. 17, which is similar to that of FIG. 16, and in which similar or identical parts are again identified by the same reference numerals, the only primary distinction resides in that the magnet which is adapted to be mounted on the arm portion of the rotor so as to be rotatable with the rotor shaft, need only be provided on one arm portion 316 in the form of a double magnetic shell 400, into which there may engage a fixed coil 402 positioned on a stationary mount 404 which is fastened to the scanning motor housing 302. A similar double magnetic shell may be located on the oppositely extending arm portion 318 of the rotor or, alternatively, the arm portion 318 may merely have a balancing weight or ballast (not shown) thereon, and with the magnetic actuation being provided by the single magnet and coil construction.

While there have been shown and described what are considered to be preferred embodiments of the invention, it will of course be understood that various modifications and changes in form or detail could readily be made without departing from the spirit of the invention. It is therefore intended that the invention not be limited to the exact form and detail herein shown and described, nor to anything less than the whole of the invention herein disclosed as hereinafter claimed.

What is claimed is:

1. A light beam scanning device comprising:

a housing;

a rotor mounted for angular oscillation with respect to said housing about an axis of rotation, said rotor including a mirror and a magnet, said mirror being disposed to receive a light beam and redirect the light beam as a scanning beam during angular oscillation of said rotor, said magnet being disposed so as to move in an arcuate path about said axis of rotation during angular oscillation of said rotor, said arcuate path comprising a portion of a circle centered on said axis of rotation;

at least one spring arm, said spring arm being generally elongated between a pair of ends, said spring arm being secured at an inner end to said rotor and secured at an outer end to said housing at a location radially outwardly from said inner end, said spring arm establishing an equilibrium angular position of said rotor with respect to said housing and imposing a restoring force, when said rotor is displaced from its equilibrium position, urging said rotor toward said equilibrium position; and an electromagnetic motor including said magnet and a generally tubular coil having an opening extending along an axis of said coil, said coil being secured to said housing with said coil axis generally tangent to said circle.

2. A light beam scanning device according to claim 1, having a plurality of said spring arms.

3. A light beam scanning device according to claim 2, wherein said spring arms comprise a spring made of a single piece of resilient material.

4. A light beam scanning device according to claim 3, wherein said resilient material is a flat flexible material.

5. A light beam scanning device according to claim 3, wherein said spring is secured to said rotor adjacent said inner ends of said spring arms.

6. A light beam scanning device according to claim 2, wherein said spring arms lie generally in a plane oriented perpendicular to said axis of rotation.

7. A light beam scanning device according to claim 2, wherein said spring arms flex generally in a plane oriented perpendicular to said axis of rotation during angular oscillation of said rotor.

8. A light beam scanning device according to claim 1, wherein said rotor includes a magnet-mounting arm to which said magnet is secured.

9. A light beam scanning device according to claim 8, wherein said spring arm is secured to said rotor closely adjacent said magnet-mounting arm.

10. A light beam scanning device according to claim 1, wherein said spring arm comprises a spiral spring in the shape of a flat plate.

11. A light beam scanning device comprising:

a housing;

a rotor mounted for angular oscillation with respect to said housing about an axis of rotation, said rotor including a mirror, a magnet, and a shaft, said shaft having a shaft axis lying generally along said axis of rotation, said mirror being disposed to receive a light beam and redirect the light beam as a scanning beam during angular oscillation of said rotor, said magnet being disposed so as to move in an arcuate path about said axis of rotation during angular oscillation of said rotor, said arcuate path comprising a portion of a circle centered on said axis of rotation;

at least one spring arm, said spring arm being generally elongated between a pair of ends, said spring arm being secured at an inner end to said rotor and secured at an outer end to said housing at a location radially outwardly from said inner end, said spring arm establishing an equilibrium angular position of said rotor with respect to said housing and imposing a restoring force, when said rotor is displaced from its equilibrium position, urging said rotor toward said equilibrium position; and an electromagnetic motor including said magnet and a generally tubular coil having an opening extending along an axis of said coil, said coil being secured to said housing with said coil axis generally tangent to said circle.

12. A light beam scanning device according to claim 11, wherein said housing includes an aperture, and said shaft rotates within said aperture during angular oscillation of said rotor.

13. A method of scanning a light beam against a target having information thereon, comprising the steps of mounting a rotor in a housing for angular oscillating movement about an axis of rotation between first and second angular end positions; imparting an angular oscillating movement to said rotor; and imparting between said first and second positions a restraining torque to the oscillating movement imparted to said rotor so as to provide a generally constant rate of angular speed within an angular range intermediate said first and second angular end positions, wherein said oscillating movement imparting step includes energizing a coil which is radially displaced from said axis of rotation and which is oriented with a coil axis generally tangent to a circle centered on said axis of rotation so as to move a magnet comprising said rotor in an arcuate path generally along said circle, and said restraining torque imparting step includes flexing a spring arm extending radially between a point of securement to said rotor and a point of securement to said housing.

14. A method according to claim 13, wherein said restraining torque imparting step provides a generally constant rate of angular speed within an angular range of at least about ±5 degrees.

15. A method according to claim 13, wherein said oscillating movement imparting step and said restraining torque imparting step are performed on said rotor at locations which are closely adjacent.

16. A method according to claim 13, wherein said rotor mounting step includes disposing a shaft comprising said rotor, with a shaft axis lying generally along said axis of rotation, for rotation within an aperture comprising said housing.

17. A light beam scanning device comprising:

a housing;

a rotor mounted for angular oscillation with respect to said housing about an axis of rotation, said rotor including a mirror disposed to receive a light beam and redirect the light beam as a scanning beam during angular oscillation of said rotor;

an electromagnetic motor coupled to said housing and said rotor, said electromagnetic motor imposing an angular oscillatory force between said housing and said rotor; and a spring coupled to said housing and said rotor, said spring imposing a restraining force to the angular oscillating movement of said rotor so as to provide a generally constant rate of angular speed within an angular range intermediate first and second angular end positions, wherein said electromagnetic motor and said spring each include an arm extending generally radially outwardly from said rotor and moving circumferentially in a plane which is perpendicular to said axis of rotation during imposition of said forces.

18. A light beam scanning device according to claim 17, wherein said electromagnetic motor arm and said spring arm are closely adjacent.

19. A light beam scanning device according to claim 17, wherein said spring arm is made of a flat flexible material.

20. A light beam scanning device according to claim 17, wherein said spring has a plurality of said spring arms.

* * * * *